J. M. WALLICK.
AUTOMOBILE DRIVE.
APPLICATION FILED APR. 14, 1915.

1,197,977.

Patented Sept. 12, 1916.
2 SHEETS—SHEET 1.

Witnesses

Inventor
John M. Wallick

J. M. WALLICK.
AUTOMOBILE DRIVE.
APPLICATION FILED APR. 14, 1915.
1,197,977.
Patented Sept. 12, 1916.
2 SHEETS—SHEET 2.
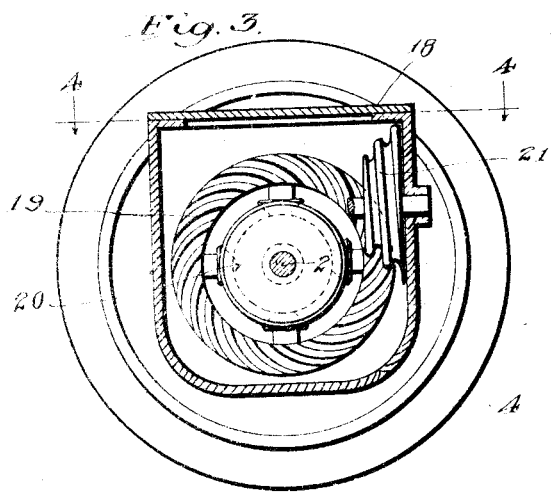
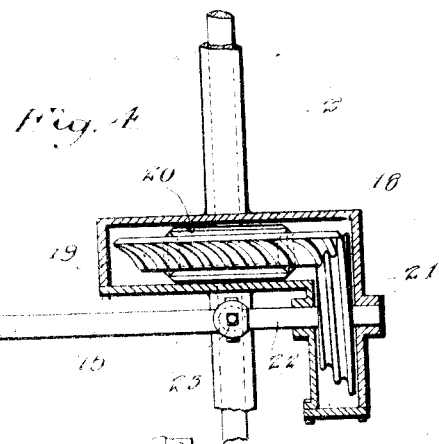
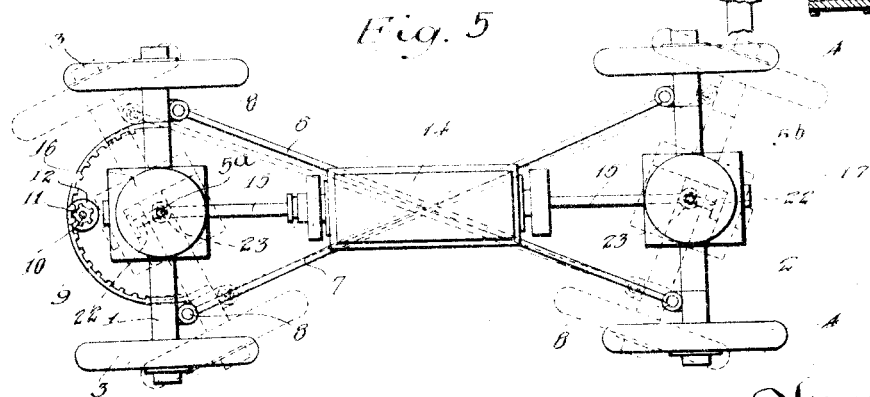
Witnesses:
Inventor
John M. Wallick.
By Frederick Whyen atty.

UNITED STATES PATENT OFFICE.

JOHN M. WALLICK, OF UPLAND, CALIFORNIA.

AUTOMOBILE-DRIVE.

1,197,977.   Specification of Letters Patent.   Patented Sept. 12, 1916.

Application filed April 14, 1915. Serial No. 21,255.

*To all whom it may concern:*

Be it known that I, JOHN M. WALLICK, a citizen of the United States, residing at Upland, in the county of San Bernardino and State of California, have invented a new and useful Automobile-Drive, of which the following is a specification.

This invention relates to improvements in automobiles and resides in the provision of simple and effective driving means for the front and rear wheels, which means is constructed to operate in conjunction with automobiles in which the rear wheels are turned as well as the front during the steering operation.

An object is to combine the front and rear wheel drive mechanism with front and rear wheel steering mechanism so that large and heavily loaded vehicles such as trucks may be steered and driven easily, reliably and without taxing the motor.

The invention consists in certain novel features of construction and combinations, and arrangement of parts as will be more fully hereinafter described and pointed out in the claims.

Figure 1:
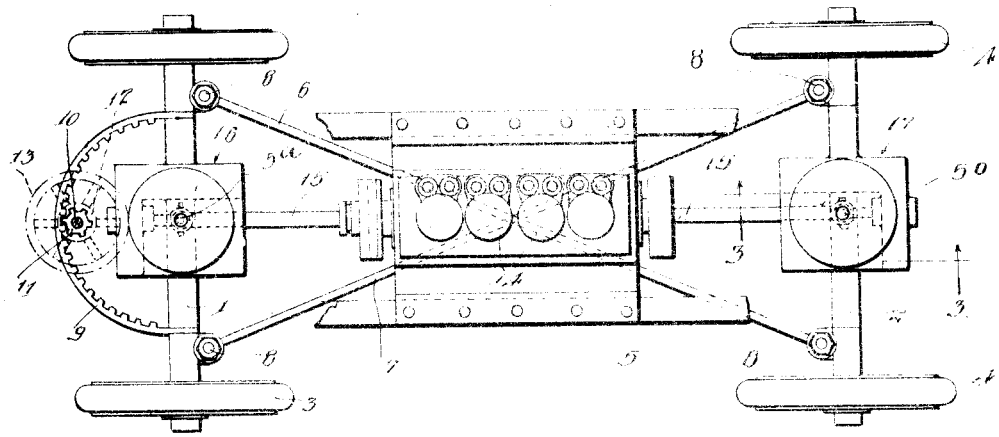
Figure 2:
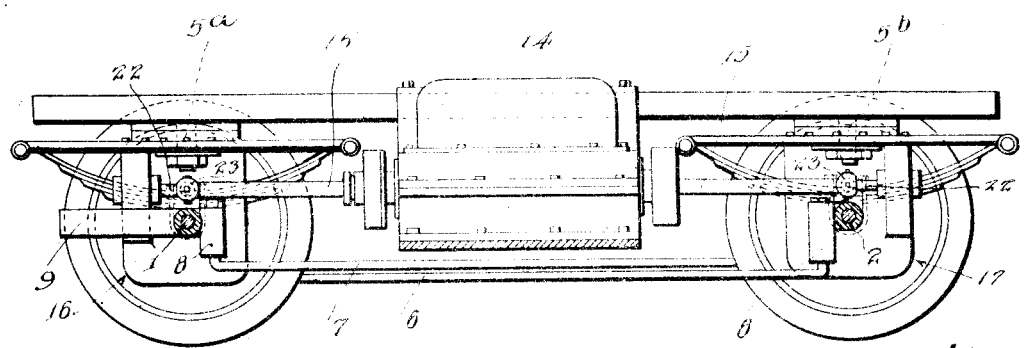

In the drawings: Figure 1 is a top plan view of an automobile constructed in accordance with my invention, showing parts broken away; Fig. 2 is a side elevation with the wheels in the foreground removed and parts shown in section; Fig. 3 is a fragmentary longitudinal sectional view taken on line 3—3 of Fig. 1; Fig. 4 is a horizontal sectional view taken on line 4—4 of Fig. 3; and Fig. 5 is a top plan view of the running gear of the automobile showing the wheels and coöperating parts in various positions.

Referring to the drawings by characters of reference, 1 and 2 designate front and rear axles, 3 and 4 front and rear wheels respectively, mounted on the axles, and 5 the frame or chassis pivotally supported by the axles as at 5ª and 5ᵇ.

The steering mechanism comprises crossed steering rods 6 and 7 which are pivoted to lugs 8 carried on the axles near the ends thereof. A curved rack bar 9 is secured at its ends to and extends forwardly from the front axle 1. A vertical steering column 10 is carried by the chassis 5 and on its lower end is a pinion 11 which coöperates with the rack 9. An annular flange 12 is formed on the pinion 11 and engages the under face of and supports the rack 9. The steering wheel 13 is secured to the upper end of the column 10. By turning the wheel the pinion 11 is rotated and causes the rack 9 to move and the wheels to be turned as desired. The front wheels in turning exert a pull and push respectively on the rods 6 and 7 causing the rear wheels to be turned in the opposite direction.

The front and rear wheel driving means comprises a motor 14 carried by the chassis 5 and a drive shaft 15 which extends forwardly and rearwardly of the motor. Differential gearing 16 and 17 is carried on the front and rear axles respectively and each comprises a casing 18 in which is mounted a large drive gear 19 and coöperating gears 20, said gears 20 being of the ordinary construction and arrangement. Instead of the ordinary drive pinion, I use a gear 21 that is located to one side of and above the axle. The gear 21 is carried by a stub shaft 22 which projects through a bearing in the casing 18 and outwardly from the casing. The drive shaft 15 is connected by universal connection 23, at its ends with the ends of the stub shafts 22. The connection between the shafts 22 and 15 is located at points centrally of the ends and above the axles, exteriorly of the casings for the differential gearing. By this construction it will be seen that the front and rear axles and particularly the differentials 16 and 17 will be allowed to move relative to the drive shaft when the front and rear wheels are turned during the steering operation.

It will be seen that large trucks and other motor vehicles will be permitted to make sharp turns with the steering mechanism which I employ, and that in combination with the driving means heavy loads may be easily pulled and all liability of the vehicle becoming stuck in ruts is obviated.

A great difficulty is experienced in turning sharp corners and turning around in narrow streets with long, large motor vehicles, and a great deal of power is lost during such turning. With my invention a large and heavily loaded motor vehicle is capable of being turned easily and reliably, and in view of the 4-wheel drive which operates in conjunction with the 4-wheel steering mechanism, no appreciable loss of power is had when turns are made.

In practice I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in construction, proportion and arrangement of parts may be resorted to when required without sacrificing any of the advantages of my invention as set forth in the appended claims.

What I claim is:

1. The combination with an automobile including a frame, a drive shaft on said frame and axles pivotally connected with the frame, of differential gearing mounted on the axles to one side of a point centrally of the ends thereof including a master wheel, a drive gear meshing with the master wheel of the differential gearing on each axle and located above and upon the outer side of the axle, and a stub shaft for each drive gear extending inwardly over the axles and having a universal connection with the drive shaft at points immediately over and centrally of the ends of the axle.

2. The combination with an automobile including a frame, a drive shaft on said frame and axles pivotally connected with the frame, of differential gearing including master bevel worm gears mounted near and to one side of points centrally of the ends of the axles, a drive worm gear meshing with the master gear of the differential gearing on each axle and located above and upon the outer side of the axle, and a stub shaft for each drive gear extending inwardly over the axles and having a universal connection with the drive shaft at points over and centrally of the ends of the axles.

In testimony whereof, I have hereunto set my hand at Los Angeles, California, this 7th day of April, 1915.

JOHN M. WALLICK.

In presence of—
CHAS. J. CHANCE,
ANNA F. SCHMIDTBAUER.